United States Patent [19]

Metlitsky et al.

[11] Patent Number: 5,191,197
[45] Date of Patent: Mar. 2, 1993

[54] ARM MOUNTED SCANNER ACTUATABLE BY HAND MOVEMENT

[75] Inventors: Boris Metlitsky, Stony Brook; Mark Krichever, Hauppauge; Ed Barkan, S. Setauket; Howard M. Shepard, Great Neck; Jerome Swartz, Old Field, all of N.Y.; Joseph Sandor, Balboa Island, Calif.

[73] Assignee: Symbol Technologies, Inc., Bohemia, N.Y.

[21] Appl. No.: 699,417

[22] Filed: May 13, 1991

Related U.S. Application Data

[63] Continuation-in-part of Ser. No. 193,265, May 11, 1988.

[51] Int. Cl.[5] .............................................. G06K 7/10
[52] U.S. Cl. .................................... 235/472; 235/462
[58] Field of Search .......................... 235/472, 462, 470

[56] References Cited

U.S. PATENT DOCUMENTS

| | | | |
|---|---|---|---|
| 4,251,798 | 2/1981 | Swartz et al. | 340/146.3 SY |
| 4,369,361 | 1/1983 | Swartz et al. | 235/470 |
| 4,387,297 | 6/1983 | Swartz et al. | 235/462 |
| 4,621,189 | 11/1986 | Kumar et al. | 235/472 |
| 4,758,717 | 7/1988 | Shepard et al. | 235/472 |
| 4,760,248 | 7/1988 | Swartz | 235/472 |
| 4,766,299 | 8/1988 | Tierney et al. | 235/472 |
| 4,850,009 | 7/1989 | Zook et al. | 379/96 |
| 4,935,610 | 6/1990 | Wike | 235/472 |
| 4,939,356 | 7/1990 | Ranuo et al. | 235/467 |
| 5,015,833 | 5/1991 | Shepard et al. | 235/472 |
| 5,023,438 | 6/1991 | Wakatsuki et al. | 235/472 |
| 5,509,778 | 10/1991 | Zouzoulas et al. | 235/472 |

FOREIGN PATENT DOCUMENTS

414452 2/1991 European Pat. Off. ............ 235/472

Primary Examiner—John W. Shepperd

[57] ABSTRACT

A hands-free scanning system for reading indicia having parts of different light reflectivity, including a housing having a window and an actuatable electro-optical scanner in the housing for projecting a light beam through the window to indicia to be read, for scanning the indicia. The system further detects light of variable intensity that is reflected off the indicia to generate an electrical signal representative of the indicia. The housing is mounted on an arm of an operator and the scanner initiates reading of the indicia upon movement of the operator's hand relative to the arm by means of an actuator switch.

39 Claims, 4 Drawing Sheets

ARM MOUNTED SCANNER ACTUATABLE BY HAND MOVEMENT

CROSS-REFERENCE TO RELATED APPLICATION

This application is a continuation-in-part of Application Ser. No. 07/193,265 filed May 11, 1988 now allowed.

This application is related to U.S. patent application Ser. No. 07/772,745, filed Oct. 7, 1991, assigned to the same assignee as the present application.

BACKGROUND OF THE INVENTION

1. Field of the Invention

This invention generally relates to arm-mounted laser scanner systems for reading indicia of different light reflectivity such as bar code symbols and, more particularly, to so-called mirrorless scanner systems wherein system components, other than mirrors, are employed to effect sweeping or scanning of symbols to be read.

2. Description of Related Art

Laser scanner systems and components of the type exemplified by U.S. Pat. Nos. 4,251,798; 4,360,798; 4,369,361; 4,387,297; 4,593,186; 4,496,831; 4,409,470; 4,460,120; 4,607,156; 4,673,803; 4,736,095; 4,758,717; 4,816,660; 4,808,804; 4,816,661; 4,760,248; 4,871,904; 4,806,742; 4,845,350, as well as U.S. Appln. Ser. Nos. 148,669 and 147,708 —all of said patents and patent applications being owned by the assignee of the instant invention and being incorporated by reference herein —have generally been designed to read indicia having parts of different light reflectivity, e.g. bar code symbols, particularly of the Unversal Product Code (UPC) type, at a certain working or reading distance from a hand-held or stationary scanner.

Typically, a light source such as a laser generates a light beam which is optically modified to form a beam spot of a certain size at the working distance and is directed by optical components along a light path toward a bar code symbol located in the vicinity of the working distance for reflection from the symbol. A photodetector having a field of view extending across and slightly past the symbol detects light of variable intensity reflected off the symbol and generates electrical signals indicative of the detected light. These electrical signals are decoded into data descriptive of the symbol. A scanning component is situated in the light path. The scanning component may either sweep the beam spot across the symbol and trace a scan line across and past the symbol, or scan the field of view of the photodetector, or do both.

In any case, the scanner typically includes a moving mirror. For example, U.S. Pat. No. 4,251,798 discloses a rotating polygon having a planar mirror at each side, each mirror tracing a scan line across the symbol. U.S. Pat. Nos. 4,387,297 and 4,409,470 both employ a planar mirror which is repetitively and reciprocally driven in alternate circumferential directions about a drive shaft on which the mirror is mounted. U.S. Pat. No. 4,816,660 discloses a multi-mirror construction composed of a generally concave mirror portion and a generally planar mirror portion, the multi-mirror construction being repetitively and reciprocally driven in alternate circumferential directions about a drive shaft on which the multi-mirror construction was mounted.

No matter what the shape or orientation of the mirror, the known scanning components employed in laser scanning systems moved mirrors to perform the aforementioned sweeping and scanning actions. Moving other laser scanning system components was not thought to be practical. Thus, moving a gas laser tube was unthinkable, particularly in hand-held, compact system applications, due to the large size and the requisite large room necessary to accommodate a moving gas laser tube. Moving an optical lens was also not thought to be desirable, because optical alignment is critical in laser scanning systems. Hence, it was the mirror that was typically designated to effect the sweeping/scanning functions. However, in some laser scanning applications, mirror movements have not been found to be altogether desirable.

In non-laser scanning systems of the type exemplified by U.S. Pat. No. 4,578,571, a non-laser light emitting diode, an optical assembly, a photodetector, and electronic preamplifier/filter circuitry are all fixedly mounted on a common support that is connected to a cantilevered bimorph which is reciprocatingly driven to jointly move all the aforementioned components back and forth over a bar code symbol to be scanned. The large volume and heavy mass of all the commonly-mounted non-laser system components requires the expenditure of a great deal of power for the drive. This is not altogether practical in those cases, e.g. battery-powered operation, where power consumption is to be held to a minimum. Also, moving only one or more non-mirrored system components relative to another for conserving power was heretofore not considered desirable, because of the optical alignment problems described above.

The components for the light scanning system, including the light source, optics, photodetector, scanning component and an electrical conductor, are mounted together in a common assembly to constitute a compact, lightweight, scan module. The scan module is mounted in an interchangeable, modular manner in housings of different configurations.

For example, the housing can be hand-held and shaped as a cylinder in a so-called flashlight-type configuration, or shaped as a box, or shaped with a gun-like configuration. The housing can be mounted on the back of an operator's arm (see, for example, U.S. Pat. No. 4,766,299) or on one or more fingers of the operator's hand, typically with the aid of a strap, a clip, or a glove. The housing can be mounted on the operator's arm, typically adjacent or on the wrist. The housing can be mounted in a countertop workstation. The housing can be mounted in a mobile cart, or shopping cart, or, in some cases, even in a stationary installation.

The compact, lightweight nature of the scan module enables myriad other housing configurations to be fashioned. Thus, the scan module can be mounted anywhere on an operator's person, e.g. in a helmet to be worn on the operator's head, in eyeglasses to be worn in front of the operator's eyes, in a shoulder or body harness, etc.

SUMMARY OF THE INVENTION

1. Objects of the Invention

It is a general object of this invention to advance the state of the art of scanner systems for reading indicia of different light reflectivity, particularly laser scanner systems for reading bar code symbols.

Another object of this invention is to eliminate the use and the movement of mirrors to effect sweeping and scanning actions.

A further object of this invention is to provide a so-called "mirrorless" scanner system which is compact in size, light in weight, reliable in use, and relatively inexpensive to assemble and manufacture.

Still another object of this invention is to move one or more scanner system components either jointly or separately relative to one another to effect the sweeping and scanning actions.

Yet another object of this invention is to employ the mirrorless scanner system in a plurality of hand-held, finger-held, arm-held, body-held, desk-top workstation, mobile or stationary configurations.

A still further object of this invention is to employ a mirrorless scanner system in a plurality of scanning modes, such as single and multi-axis scanning.

Another object of this invention is to interchangeably mount the mirrorless scanner system in housings of different configurations.

2. Features of the Invention

In keeping with these objects, and others which will become apparent hereinafter, one feature of this invention resides, briefly stated, in a mirrorless scanner arrangement in a light scanning system for reading indicia having parts of different light reflectivity, e.g. bar code symbols having alternating bars and spaces. The system is of the general type which includes a light source component, e.g. a laser, for emitting a laser light beam; an optical component, e.g. a focusing lens and/or an aperture stop, for optically modifying and directing the laser beam along an optical path toward the symbol located in the vicinity of a reference plane exteriorly of the system; and a photodetector component, e.g. a photodiode, having a field of view and operative for detecting at least a portion of light of variable intensity along a return path reflected off the symbol, and for generating an electrical signal indicative of the detected light intensity. This electrical signal is thereupon processed and converted to data descriptive of the symbol.

In accordance with this invention, the mirrorless scanner arrangement includes means for mounting at least one of the components for repetitive, reciprocating movement relative to at least another of the components, as well as drive means for repetitively, reciprocatingly moving the mounting means and said at least one component to scan at least one of said light beam and said field of view. Only one or only two of said components can advantageously be reciprocated relative to said other components. In addition, all the components can be jointly reciprocated, in which event, it is advantageous if the optical and return paths are co-linear, at least within a housing in which all the aforementioned components are housed.

Advantageously, the drive means includes a motor having an elongated shaft, and operative for reciprocatingly turning the shaft about an axis which extends along the elongation of the shaft in alternate circumferential directions over arc lengths less than 360°, e.g. 10° to either side of a center position. Said at least one component is mounted on the shaft for joint turning movement therewith.

The component mounted on the shaft may be the laser, e.g. a semiconductor laser diode, a focusing lens, an aperture stop, the combination of a focusing lens and an aperture stop, or the entire combination of the diode, the lens and the aperture stop. Also, the photodiode could be mounted on the shaft for joint turning movement therewith. Since the diode requires a power supply, e.g. a 12-volt DC source, and since the electrical signal developed by the photodiode must be conveyed to signal processing circuitry, electrical coiled tensile wires are advantageously connected to the laser diode and the photodiode.

Rather than turning the aforementioned components about an axis, the drive means may also be operative to reciprocatingly move one or more of said components in a plane which is perpendicular to an optical axis along which the optical path extends in a center position. Such planar movement can be effected by many types of drives, e.g. an electromagnetic drive, a mechanical drive, a piezoelectric drive, and a bimetallic heating drive.

The mirrorless scanner arrangement of this invention can be used to generate a single scan line over the symbol to be read, or can be used with other scanner components to generate a multi-line scan pattern over the symbol.

In addition, the mirrorless scanner arrangement is very compact in size and light in weight, and can be mounted in modular manner in many different system configurations. For example, the arrangement can be mounted in hand-held housings having any convenient shape, e.g. a gun-shaped head having a barrel and a handle, or a box-like head, or a cylindrical-type head, or in wrist-held or arm-held housings, or in glove-like housings, or in finger-held housings, e.g. a ring-shaped head, or in desk-top or countertop housings, e.g. a workstation having scan-above, scan-down, or scan-sideways capabilities, or in mobile, cart-mounted housings, or in stationary system installations, e.g. mounted at a production line or at a cash register. The compact size and lightweight characteristic renders the arrangement very versatile for multiple applications and uses. The power requirements for reciprocating the one or more components to be reciprocated is minimal. Advantageously, the arrangement is easily removable from the system in which it is installed. An arrangement requiring replacement is easily interchangeable with another.

In a preferred embodiment, the housing is mounted on an arm of an operator, and reading of indicia is initiated upon movement of the operator's hand relative to the operator's arm by means of an actuator switch.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

DETAILED DESCRIPTION OF DRAWINGS

Figure 1A:
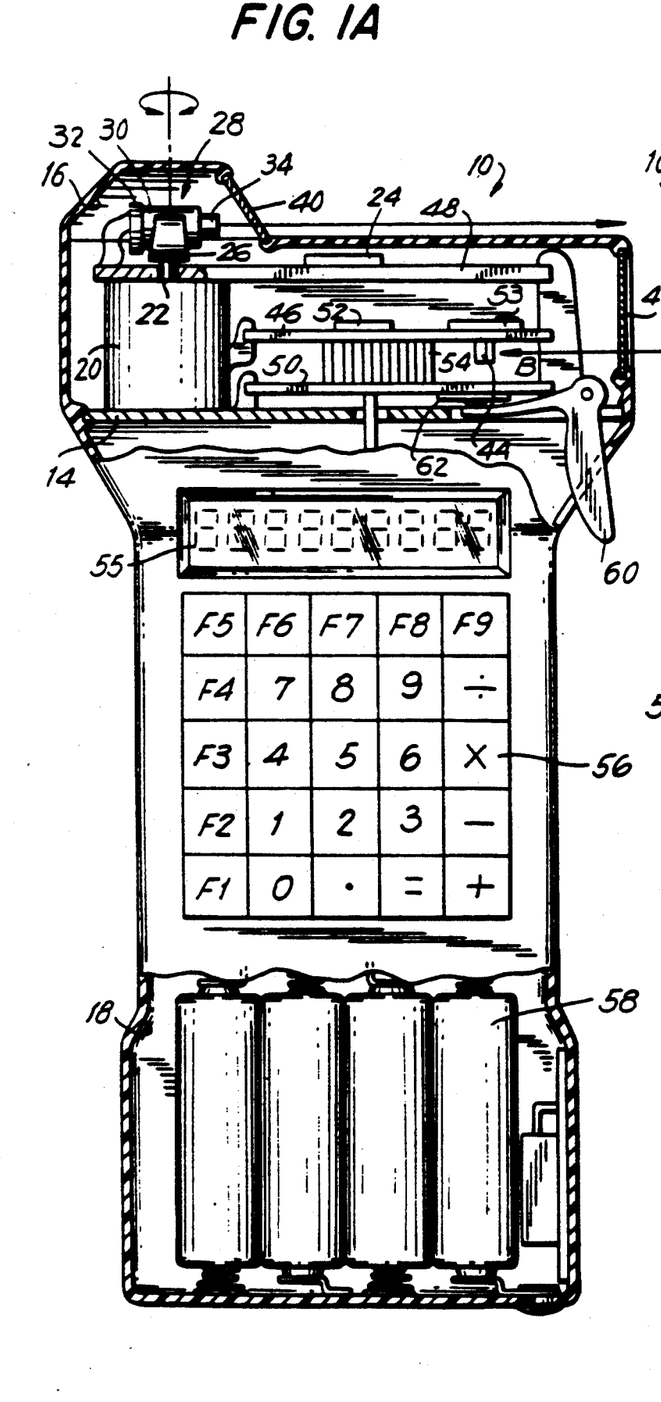
FIG. 1A is a partly broken-away, partly sectioned side view of a hard-held light scanning system in which a mirrorless scanner arrangement in accordance with this invention is housed.
Figure 1B:
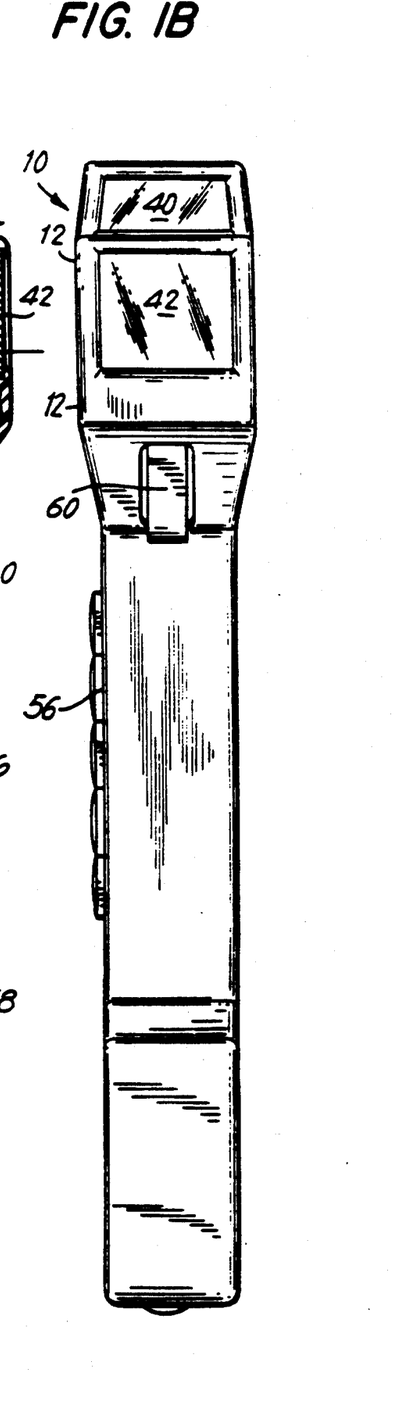
FIG. 1B is an end view of FIG. 1A.

Referring now to the drawings, reference numeral 10 in FIGS. 1A and 1B generally identifies an arrangement in a scanner system of the type generally described in the above identified patents and patent applications, the entire contents of all of which are hereby incorporated by reference herein, for reading symbols, particularly UPC bar code symbols. As used in this specification and the following claims, the term "symbol" is intended to be broadly construed and to cover not only symbol patterns composed of alternating bars and spaces, but also other patterns, as well as alpha-numeric characters and, in short, any indicia having portions of different light reflectivity.

The arrangement 10 comprises a hand-held housing 12 having a base 14 which subdivides the interior of the housing into an upper half 16 and a lower half 18. A lightweight, high-speed, miniature scanning motor 20 similar to that described in U.S. Pat. No. 4,496,831 is mounted on base 14. The motor 20 has an output shaft 22 which is repetitively driven in alternate circumferential directions about an axis along which the shaft extends over arc lengths less than 360° in each direction. Structural, functional and operational aspects of the motor 20 and of control circuitry 24 for the motor are set forth in detail in U.S. Pat. No. 4,496,831 and, hence, for the sake of brevity, will not be repeated herein.

One difference between the motor 20 of this invention and the motor of U.S. Pat. No. 4,496,831 is the superstructure that is mounted on the output shaft 22. Instead of a planar mirror as taught by said patent, the invention proposes, in FIG. 1A, mounting a generally U-shaped support 26 at the end of the shaft 22, and mounting a laser/optics subassembly 28 on the support 26. The subassembly 28 and the support 26 are jointly oscillated and turned with the shaft 22.

The subassembly 28 includes an elongated hollow tube 30, a laser diode 32 fixedly mounted at one axial end region of the tube 30, a lens barrel 34 mounted at the opposite axial end region of the tube 30, and a focusing lens 36 mounted within the barrel (see FIG. 3). the focusing lens 36 is preferably a plano-convex lens, but ray be spherical, convex or cylindrical as well. The barrel 34 has an end wall formed with an aperture stop 38 which is an end wall formed with an aperture stop 38 which is an opening extending through the end wall. The barrel 34 is mounted for longitudinal telescoping movement within and along the tube 30. The lens 36 is situated adjacent the end wall of the barrel and is mounted for joint movement with the barrel. The position of the barrel and, in turn, of the lens relative to the diode is fixed typically by gluing or clamping, at the assembly site so that a known distance between the lens and the aperture stop, on the one hand, and between the lens, the aperture stop and the diode, on the other hand, is obtained. A coil spring 37 (see FIG. 3) is located within and extends along the barrel and tube, and has one coil end bearing against the diode, and another coil end bearing against a planar side of the lens. The spring urges the lens against the end wall having the aperture stop, thereby fixedly locating the lens relative to the aperture stop.

The subassembly 28, per se, forms no part of this invention and, in fact, is described and claimed U.S. Pat. No. 4,816,660 to which reference can be had for further structural, functional and operational aspects of the subassembly. It is sufficient for this invention to understand that the subassembly 28 includes a solid-state laser diode 32 operative for propagating and generating an incident laser beam, either in the invisible or visible light range, and the combination of a focusing lens and an aperture stop together operative for focusing the laser beam to have a beam cross-section or beam spot of a certain waist size within a range of working distances relative to the housing 12. The focused beam passes through the aperture stop 38 and through a scan window 40 on the housing in the vicinity of a reference plane located exteriorly of the housing within the range of working distances along an outgoing optical path.

During the alternate, repetitive oscillations of the shaft 22, the support 26 and the subassembly 28 likewise participate in this oscillatory movement, thereby causing the beam spot to be swept in an arc whose center of curvature is located at the diode across the symbol at the reference plane and to trace a curved scan line thereat. Hence, no longer is a mirror used to effect sweeping of a beam spot across a symbol, but, instead, other scanner components are moved and, in the embodiment of FIG. 1A, these other components comprise the laser diode 32 and the optical components which are jointly turned as a unitary structure about an axis parallel to the reference plane.

A portion of the least reflected off the symbol passage along a return path through a second window 42 on the housing in the direction of arrow B to a photodetector 44 for detecting the variable intensity of the returning portion of the reflected laser light over a field of view, and for generating an electrical analog signal indicative of the detected variable light intensity. In the FIG. 1A embodiment, the photodetector 44 is stationarily mounted on the printed circuit board 46. Printed circuit boards 48 and 50 at either side of board 46 contain signal processing circuitry 52 and microprocessor control circuitry 53 for converting the analog electrical signal to a digital signal, and for processing the digital signal to data descriptive of the symbol being read. Details of the signal processing and microprocessor control circuitry can be had by reference to the above-identified patents and applications.

A two-part multi-wire plug-in cable connector 54 has one part electrically connected to the signal processing and microprocessor control circuitry and another part electrically connected to a flexible multi-wire cable 54' connected to a display 55 and a keyboard 56. A rechargeable battery pack 58 supplies power to the laser diode and the electrical circuitry in the housing. By moving only the laser diode and the optical component relative to the stationary photodetector, power from the battery pack is conserved.

Means for initiating reading may advantageously include a trigger 60 mounted on the housing 12. The trigger extends in part outwardly of the housing to be manually actuated by a user who is holding the housing 12 in his hand. The trigger is operatively connected through trigger switch 62 and actuates the laser diode 32, the motor 20, the photodetector 44, the signal processing circuitry 52 and the control circuitry 53 to initiate a reading of the symbol. The trigger is actuated once for each symbol to be read, each symbol in its respective turn. Once the control circuitry determines that the symbol has been successfully decoded, the control circuitry terminates the reading of the symbol and deactuates the previously actuated components in the housing and readies the system for the next symbol.

Figure 2:
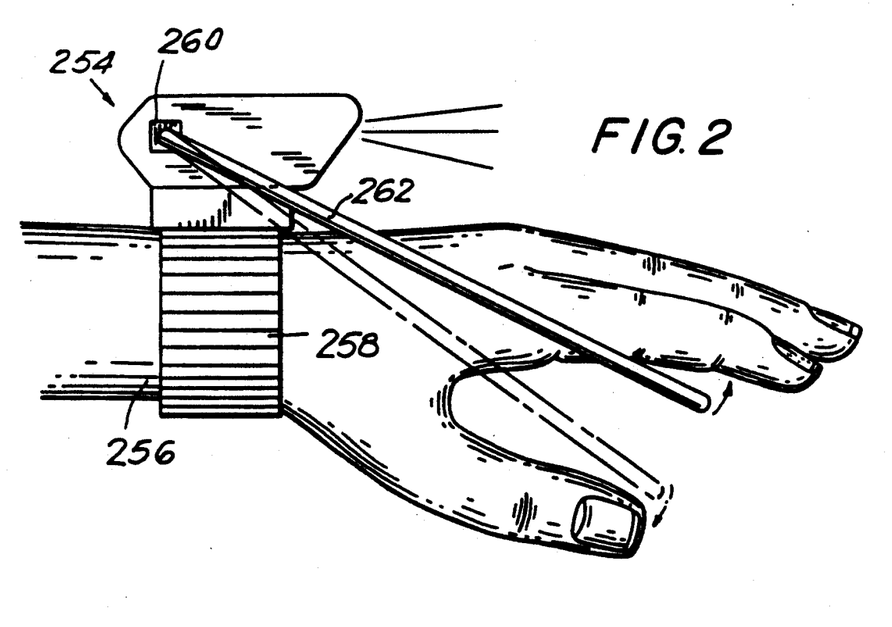
FIG. 2 is a side view of an arm-held scanning system for use with the mirrorless scanning arrangement.

As shown in FIG. 2, any of the above-described mirrorless scanning arrangement, or any of the mirrorless scanning arrangements described in U.S. Pat. Appln. Ser. No. 07/193,265, identified above, can be mounted in a box-shaped housing 254 which is mounted on the user's arm adjacent the wrist 256 by a strap 258 that at least partially encircles the wrist. The strap 258 is preferably composed of multiple expandable links, but can also be constituted of an elastomeric material, or a rigid material whose opposite ends are detachably interconnected, similar to a belt or a watch band.

Reading is initiated either automatically by object recognition, or manually by movement of the hand of the operator. For example, a trigger switch 260 has an elongated armature 262 pivotably mounted on, and laterally offset from, the housing 254. The armature 262 extends into the space formed between the forefinger and the thumb of the operator. The operator's fingers pivot the armature 262 to initiate reading. For ergonometric reasons, it is preferred if the armature 262 is positioned closer to the forefinger, as shown in solid lines in FIG. 2, so that the armature can be displaced upwards, or if the armature 262 is positioned closer to the thumb, as shown in dashed lines in FIG. 2, so that the armature can be displaced downwards.

Figure 3:
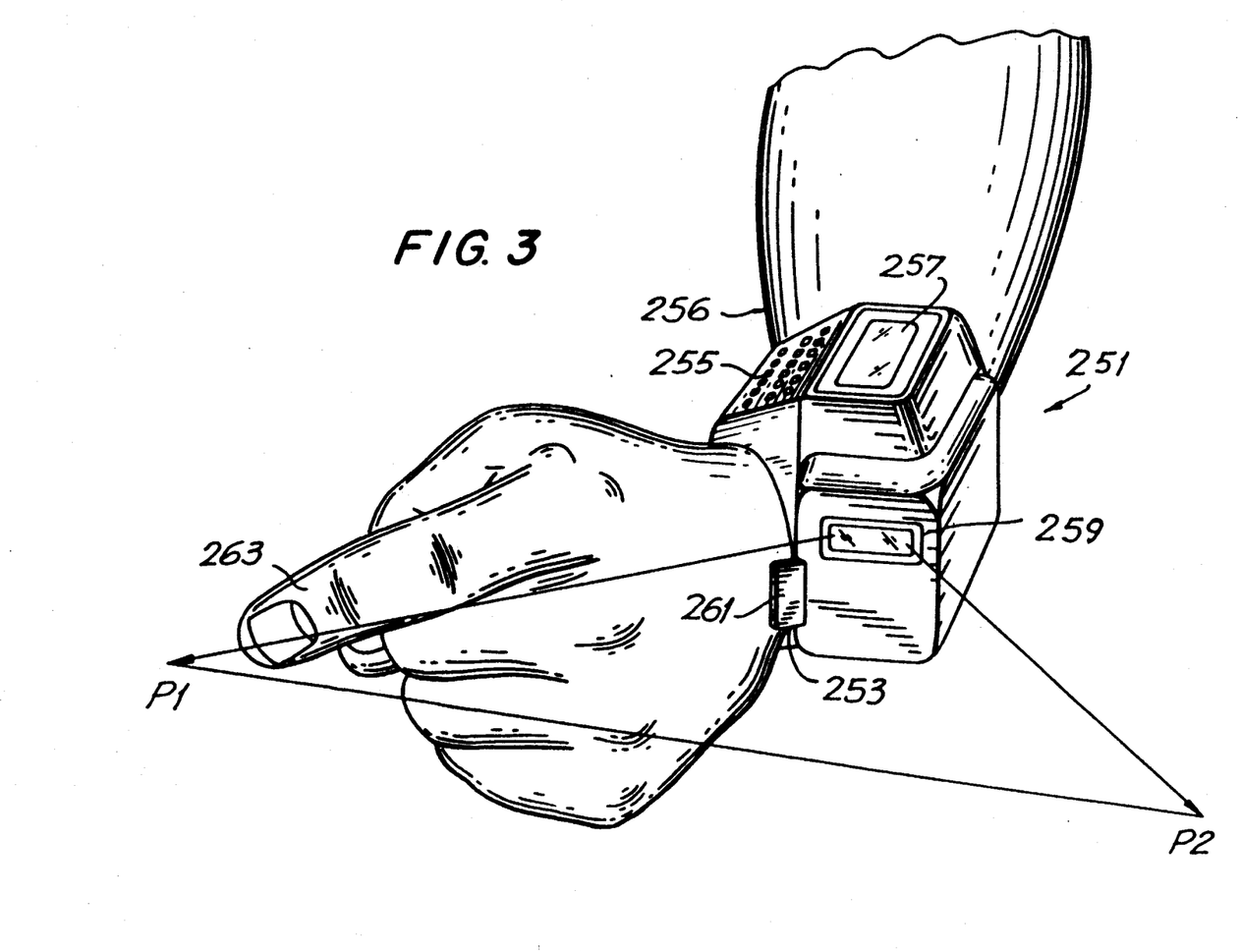
FIG. 3 is a front perspective view of another arm-held acanning system for use with the mirrorless scanning arrangement.

As shown in FIG. 3, another arm-held housing 251 is mounted adjacent and encircles wrist 256 by means of a strap 253. A keyboard 255 for data entry, as well as a display 257 for displaying information, are positioned on the housing 251 so as to face the operator. An exit window 259 is positioned adjacent the wrist and laterally offset from the back of the operator's hand to allow an outgoing light beam and/or reflected light to pass laterally thereof. A trigger switch 261 is pivotably mounted in the housing 251 adjacent the wrist and in the path of outward movement of the back of the operator's hand when the wrist is flexed relative to the arm. In a preferred use, the operator points his or her outstretched forefinger 263 toward the symbol to be read, and swings the forefinger, together with the whole hand by flexing the wrist 256, freely in space between the points P1 and P2 so as to trace the symbol.

Figure 4:
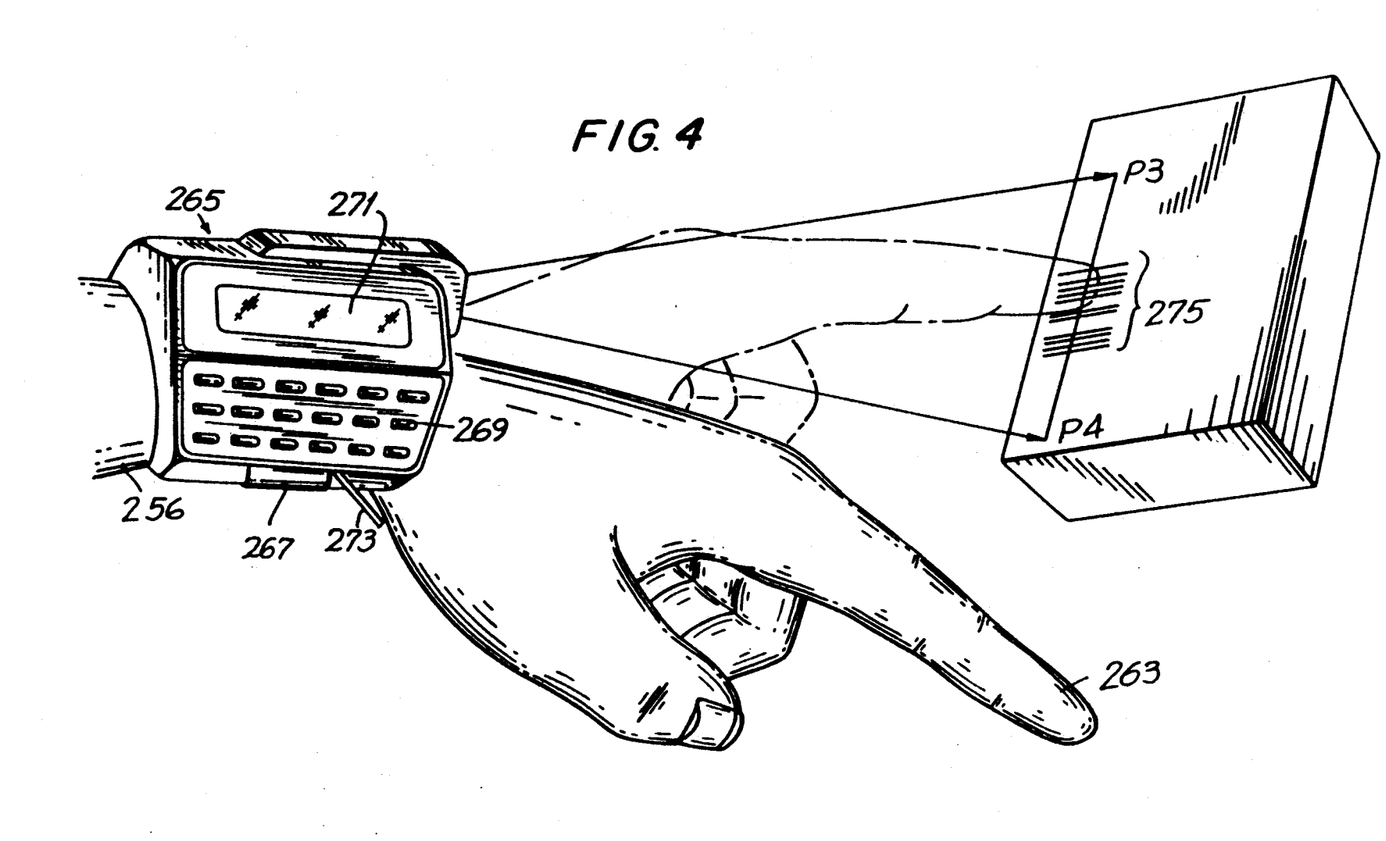
FIG. 4 is a side perspective view of still another arm-held scanning system for use with the mirrorless scanning arrangement.

As shown in FIG. 4, still another arm-held housing 265 is mounted adjacent and encircles wrist 256 by means of a strap 267. A keyboard 269 and a display 271 are positioned on the housing 265. In this case, the exit window is positioned adjacent the wrist and elevated above the back of the operator's hand to allow an outgoing light beam and/or reflected light to pass thereover. A trigger switch 273 is pivotably mounted in the housing adjacent the wrist and in the path of inward movement of the hand during wrist flexure. Again, the operator points outstretched finger 263 toward the symbol 275, and swings the forefinger, together with the whole hand, freely in space between points P3 and P4 so as to trace the symbol.

In addition to the embodiments, in which a lever switch may be employed to initiate scanning, a switch may also be provided on the strap which mounts the scanner/terminal on the wrist to perform the scanning initiating function. Such switch when mounted on the inside of the strap so that the switch may be activated by appropriate user motion.

As an alternative to a lever or other pressure operated switch, electronic activation may be utilized to initiate scanning. Object sensing (i.e., triggering when an object is proximate to the scanner), or voice activation (i.e., triggering when the user says "scan") may also be used.

The "glove" approach allows functional modules in addition to scanning to be added or deleted with relative ease. Such modules may include functions such as keyboard, display, communications, power supply, memory, and data storage, printer, or alternative reader technologies (e.g., magnetic stripe) which can be interchangeably attached or detached from electrical connectors disposed the glove. The glove also allows appropriate fixed positioning of such modules so that they may be most conveniently accessed and utilized by the user. As an example, as shown in FIG. 24A the display may be positioned on the inside of the arm or wrist, and a keyboard positioned so that it is more easily accessed.

The arrangements of FIGS. 24A, 24B serve as complete, independent data terminals.

Turning now to FIG. 25, a box-shaped housing 277, analogous to housing 254 of FIG. 24, is incorporated in a glove 279 that is worn on the operator's hand. The glove 279 is preferably composed of an elastomeric material. The housing has a base support 281 that- is embedded in the glove and rests above the back of the operator's hand between the knuckles and the wrist. The outgoing light beam and/or returning reflected light pass over the operator's fingers. Reading is initiated either automatically by object recognition, or manually by movement of the operator's hand. For example, clenching the hand can cause a pressure sensor embedded in the glove to generate a trigger signal for initiating reading.

We claim:

1. A hands-free scanning system for reading indicia having parts of different light reflectivity, comprising:
    (a) a housing having a window;
    (b) actuatable electro-optical scanner means in the housing, for projecting a light beam through the window to indicia to be read, for scanning the indicia, and for detecting light of variable intensity that is reflected off the indicia to generate an electrical signal representative of the indicia;
    (c) means for mounting the housing on an arm of an operator; and
    (d) actuating means for actuating the scanner means to initiate reading of the indicia upon movement of the operator's hand relative to the arm.

2. The system as recited in claim 1; and further comprising data entry means for manually entering data and display means for displaying information, said data entry means and display means being counted on the housing to constitute, together with the scanner means, an integrated scanner and data terminal.

3. The system as recited in claim 1, wherein the window is located adjacent the operator's wrist, and wherein the scanner means projects the light beam over the back of the operator's hand in a pointing direction along which the operator's outstretched forefinger generally points.

4. The system as recited in claim 1, wherein the actuating means includes a trigger switch switchable between states by flexure of the wrist of the operator's hand.

5. The system as recited in claim 4, wherein the switch includes a movable armature mounted on the housing.

6. The system as recited in claim 5, wherein the armature is pivotably mounted on the housing and overlies the back of the operator's band.

7. The system as recited in claim 5, wherein the armature is an elongated handle pivotably mounted on, and laterally offset relative to, the housing, said handle extending between the forefinger and the thumb of the operator's hand.

8. The system as recited in claim 1, wherein the mounting means includes a strap that at least partially encircles the operator's wrist.

9. The system as recited in claim 8, wherein the strap includes multiple expandable links.

10. The system as recited in claim 8, wherein the strap is constituted of an elastomeric material.

11. The system as recited in claim 1, wherein the electro-optical scanner means includes means for generating and directing a laser beam through the window.

12. A hands-free integrated scanner and data terminal for reading indicia having parts of different light reflectivity, comprising:
  (a) a housing having a window;
  (b) actuatable electro-optical scanner means in the housing, for projecting a light beam through the window to indicia to be read, for scanning the indicia, and for detecting light of variable intensity that is reflected off the indicia to generate an electrical signal representative of the indicia;
  (c) means for mounting the housing on an arm of an operator;
  (d) actuating means for actuating the scanner means to initiate reading of the indicia upon movement of the operator's hand relative to the arm;
  (e) data entry means on the housing, for manually entering data; and
  (f) display means on the housing for displaying information.

13. The hands-free scanner and data terminal as recited in claim 12, wherein the window is located adjacent the operator's wrist, and wherein the scanner means projects the light beam over the back of the operator's hand in a pointing direction along which the operator's outstretched forefinger generally points.

14. The hands-free scanner and data terminal as recited in claim 12, wherein the actuating means includes a trigger switch switchable between states by flexure of the wrist of the operator's hand.

15. The hands-free scanner and data terminal as recited in claim 14, wherein the switch includes a movable armature mounted on the housing.

16. A scanner arrangement in a light scanning system for reading indicia having parts of different light reflectivity, comprising:
  (a) a light source component for emitting a light beam;
  (b) an optical component for optically directing the light beam along an optical path toward indicia located in the vicinity of a reference plane exteriorly of the system;
  (c) a photodetector component having a field of view and operative for detecting at least a portion of light of variable intensity reflected off the indicia, and for generating an electrical signal indicative of the detected light intensity;
  (d) a scanning component for scanning at least one of the light beam and the field of view;
  (e) an electrical connecting component for conducting the electrical signal away from the photodetector component;
  (f) all of said components being mounted together in a common assembly to constitute a compact, lightweight scan module;
  (g) means for mounting the scan module on an arm of an operator; and
  (h) actuating means to actuate the scanner by moving the hand relative to the arm.

17. A method of reading indicia having parts of different light reflectivity, comprising the steps of:
  (a) mounting an actuatable electro-optical scanner having a window on an arm of an operator; and
  (b) actuating the scanner by moving the operator's hand relative to the arm to project a light beam through the window to indicia to be read, to scan the indicia, and to detect light of variable intensity that is reflected off the indicia for generating an electrical signal representative of the indicia.

18. The method as recited in claim 17, wherein the actuating step is performed by pointing the operator's outstretched forefinger toward the indicia, and by tracing the forefinger in free space across the indicia while simultaneously flexing the operator's wrist.

19. The method as recited in claim 17, wherein the actuating step is performed by overlying an armature of a trigger switch over the back of the operator's hand.

20. The method as recited in claim 17, wherein the actuating step is performed by extending an armature of a trigger switch between the forefinger and the thumb of the operator's hand.

21. The method as recited in claim 17, wherein the mounting step is performed by strapping the scanner on the operator's arm adjacent the wrist.

22. A scanning system for reading indicia having parts of different light reflectivity, comprising:
  (a) a housing having a window;
  (b) actuatable electro-optical scanner means in the housing, for projecting a light beam through the window to indicia to be read, for scanning the indicia, and for detecting light of variable intensity that is reflected off the indicia to generate an electrical signal representative of the indicia;
  (c) means for mounting the housing on an operator; and
  (d) actuating means for actuating the scanner means to initiate reading of the indicia upon movement of the operator's finger from one position relative to the hand to another different position relative to the hand.

23. The system as recited in claim 22, wherein the operator's finger is generally outstretched in at least one of said positions.

24. The system as recited in claim 22, wherein the window is located above the operator's hand, and wherein the scanner means projects the light beam over the back of the operator's hand.

25. The system as recited in claim 22, wherein the actuating means includes a trigger switch switchable between states by said movement of the operator's finger.

26. The system as recited in claim 25, wherein the switch includes a movable member mounted on the housing.

27. The system as recited in claim 26, wherein the member is an elongated handle pivotably mounted on, and laterally offset relative to, the housing, said handle extending between the forefinger and the thumb of the operator's hand.

28. A method of reading indicia having parts of different light reflectivity, comprising the steps of:
  (a) mounting an actuatable electro-optical scanner having a window on an operator; and (b) actuating the scanner by moving the operator's index finger from one position relative to the operator's hand to another different position relative to the hand, said index finger being generally pointed in the direction of the indicia in one of said positions, thereby causing the scanner to project to light beam through the window to the indicia to be read, to scan the indicia, and to detect light of variable intensity that is reflected off the indicia for generating an electrical signal representative of the indicia.

29. The system as recited in claim 26, wherein the movable member is in physical contact with a portion of the finger.

30. The method as recited in claim 28, wherein the mounting step is performed by locating the window above the back of the operator's hand, and wherein the actuating step causes the light beam to be projected over the back of the operator's hand.

31. The method as recited in claim 28, wherein the actuating step is performed by switching a trigger switch between states by said movement of the operator's index finger.

32. The method as recited in claim 31, wherein the actuating step is performed by pressing a top portion of the operator's index finger into engagement with the trigger switch.

33. The method as recited in claim 28, wherein the actuating step is performed by causing the scanner to project a laser light beam through the window.

34. A scanning system for reading indicia having parts of different light reflectivity, comprising:
   (a) a housing having a window;
   (b) actuatable electro-optical scanner means in the housing, for projecting a light beam through the window to indicia to be read, for scanning the indicia, and for detecting light of variable intensity that is reflected off the indicia to generate an electrical signal representative of the indicia;
   (c) means for mounting the housing on an operator; and
   (d) actuating means for actuating the scanner means to initiate reading of the indicia upon movement of the operator's hand as the operator's finger is moved to an outstretched position in which the finger generally points at the indicia.

35. The system as recited in claim 34, wherein the window is located above the operator's hand, and wherein the scanner means projects the light beam over the back of the operator's hand.

36. The system as recited in claim 34, wherein the actuating means includes a trigger switch having a movable member mounted on the housing and contacted by the back of the operator's hand during said movement.

37. The system as recited in claim 34, and further comprising data entry means for manually entering data and display means for displaying information, said data entry means and display means being mounted on the housing to constitute, together with the scanner means, an integrated scanner and data terminal.

38. A method of reading indicia having parts of different light reflectivity, comprising the steps of:
   (a) mounting an actuatable electro-optical scanner having a window on an operator; and
   (b) actuating the scanner by moving the operator's hand and tracing the operator's generally outstretched index finger in free space across the indicia, thereby causing the scanner to project a light beam through the window to the indicia to be read, to scan the indicia, and to detect light of variable intensity that is reflected off the indicia for generating an electrical signal representative of the indicia.

39. The method as recited in claim 38, wherein the actuating step is performed by switching a trigger switch between states while the back of the operator's hand is pressed into engagement with the trigger switch.

* * * * *